(12) United States Patent
Huh et al.

(10) Patent No.: US 8,681,105 B2
(45) Date of Patent: Mar. 25, 2014

(54) MOBILE TERMINAL AND SCREEN DISPLAYING METHOD THEREOF

(75) Inventors: Han Sol Huh, Seoul (KR); Yeu Cheon Lee, Seoul (KR); Ha Yang Jung, Seoul (KR); Ka Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/026,405

(22) Filed: Feb. 5, 2008

(65) Prior Publication Data

US 2008/0261660 A1    Oct. 23, 2008

(30) Foreign Application Priority Data

Apr. 20, 2007  (KR) .................. 10-2007-0038631
Apr. 20, 2007  (KR) .................. 10-2007-0038632
Apr. 20, 2007  (KR) .................. 10-2007-0038701

(51) Int. Cl.
*G06F 3/041* (2006.01)

(52) U.S. Cl.
USPC ............ 345/173; 715/848; 715/863; 345/156

(58) Field of Classification Search
USPC .............. 345/156–169, 173–179; 463/37–38; 178/18.01, 18.03, 18.05, 18.06
See application file for complete search history.

(56) References Cited

U.S. PATENT DOCUMENTS

| | | | | |
|---|---|---|---|---|
| 5,303,388 A * | 4/1994 | Kreitman et al. | ............. | 715/836 |
| 5,452,414 A * | 9/1995 | Rosendahl et al. | ........... | 715/836 |
| 5,515,486 A * | 5/1996 | Amro et al. | ................... | 715/848 |
| 5,621,906 A * | 4/1997 | O'Neill et al. | ................ | 715/848 |
| 5,678,015 A * | 10/1997 | Goh | .............................. | 715/782 |
| 5,689,287 A * | 11/1997 | Mackinlay et al. | ........... | 345/427 |
| 5,724,492 A * | 3/1998 | Matthews et al. | ............. | 345/419 |
| 5,767,854 A * | 6/1998 | Anwar | ......................... | 715/848 |
| 6,062,978 A * | 5/2000 | Martino et al. | .................. | 463/9 |
| 6,157,371 A * | 12/2000 | Smeets | ......................... | 345/168 |
| 6,157,383 A * | 12/2000 | Loop | ............................ | 345/419 |
| 6,266,098 B1 * | 7/2001 | Cove et al. | ..................... | 348/563 |
| 6,363,404 B1 * | 3/2002 | Dalal et al. | ..................... | 715/201 |
| 6,467,205 B1 * | 10/2002 | Flagg et al. | ..................... | 40/107 |
| 6,522,347 B1 * | 2/2003 | Tsuji et al. | ..................... | 715/848 |
| 6,593,942 B1 * | 7/2003 | Bushmitch et al. | ........... | 715/721 |
| 6,597,358 B2 * | 7/2003 | Miller | .......................... | 345/427 |
| 6,621,509 B1 * | 9/2003 | Eiref et al. | ..................... | 715/836 |
| 6,645,070 B2 * | 11/2003 | Lupo | ................................. | 463/9 |
| 6,710,788 B1 * | 3/2004 | Freach et al. | ................. | 715/778 |
| 6,774,914 B1 * | 8/2004 | Benayoun | ..................... | 345/650 |
| 6,880,132 B2 * | 4/2005 | Uemura | ........................ | 715/848 |
| 6,938,218 B1 * | 8/2005 | Rosen | ............................ | 715/850 |

(Continued)

FOREIGN PATENT DOCUMENTS

EP    1 052 566 A1    11/2000
JP    2003323140    *  11/2003

(Continued)

*Primary Examiner* — Gregory J Tryder
(74) *Attorney, Agent, or Firm* — Birch, Stewart, Kolasch & Birch, LLP

(57) ABSTRACT

A mobile terminal and screen displaying method thereof are disclosed, by which an image can be displayed on a screen using a virtual polyhedral pillar. The present invention includes a user input unit for inputting key signals, a display for displaying a first facet of a polyhedral pillar, and a controller, if a specific key signal is inputted, the controller controlling a second facet of the polyhedral pillar to be displayed on the display by rotating the polyhedral pillar.

15 Claims, 15 Drawing Sheets

(56) References Cited

U.S. PATENT DOCUMENTS

| | | | |
|---|---|---|---|
| 7,134,095 B1 * | 11/2006 | Smith et al. | 715/860 |
| 7,216,305 B1 * | 5/2007 | Jaeger | 715/849 |
| 7,346,373 B2 * | 3/2008 | Kim | 455/566 |
| 7,487,467 B1 * | 2/2009 | Kawahara et al. | 715/810 |
| 7,543,245 B2 * | 6/2009 | Irimajiri | 715/836 |
| 7,558,697 B2 * | 7/2009 | Anderson | 702/178 |
| 7,590,995 B2 * | 9/2009 | Nakamura et al. | 725/52 |
| 7,725,839 B2 * | 5/2010 | Michaels | 715/836 |
| 2001/0015719 A1 * | 8/2001 | Van Ee et al. | 345/158 |
| 2001/0040571 A1 * | 11/2001 | Miller | 345/419 |
| 2002/0067378 A1 * | 6/2002 | Abdelhadi et al. | 345/836 |
| 2003/0142136 A1 | 7/2003 | Carter et al. | |
| 2005/0215310 A1 * | 9/2005 | Boyd et al. | 463/20 |
| 2006/0018207 A1 * | 1/2006 | Saito | 369/30.01 |
| 2006/0020898 A1 * | 1/2006 | Kim et al. | 715/764 |
| 2006/0055789 A1 * | 3/2006 | Jin et al. | 348/208.12 |
| 2007/0097115 A1 * | 5/2007 | Ok et al. | 345/419 |
| 2007/0168875 A1 * | 7/2007 | Kowitz et al. | 715/764 |
| 2007/0261001 A1 * | 11/2007 | Nagiyama et al. | 715/810 |
| 2008/0001924 A1 * | 1/2008 | de los Reyes et al. | 345/173 |
| 2008/0266289 A1 * | 10/2008 | Park | 345/419 |

FOREIGN PATENT DOCUMENTS

| | | | |
|---|---|---|---|
| KR | 10-2004-0022638 A | | 3/2004 |
| KR | 2020040022638 | * | 3/2004 |
| KR | 10-2006-0033842 A | | 4/2006 |
| KR | 10-0703813 B1 | | 4/2007 |
| WO | WO 2005/091122 | * | 9/2005 |
| WO | WO-2005/091122 A2 | | 9/2005 |
| WO | WO-2007/042857 A1 | | 4/2007 |

* cited by examiner

FIG. 5
(a)
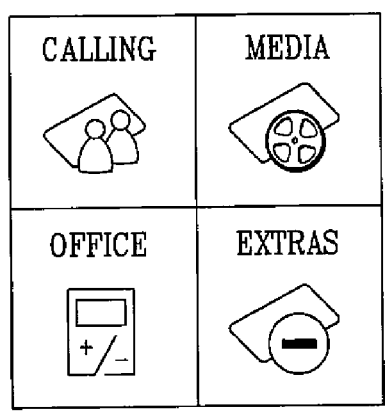
(b)
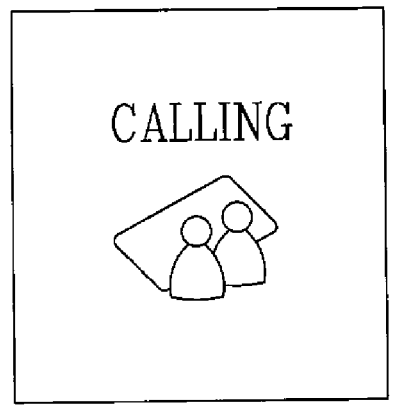
(c)
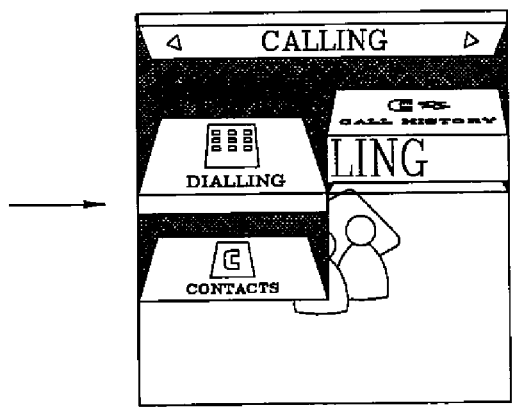
(d)
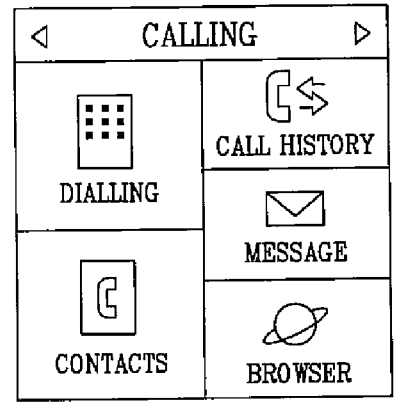

MOBILE TERMINAL AND SCREEN DISPLAYING METHOD THEREOF

CROSS REFERENCE TO RELATED APPLICATIONS

This application claims the benefit of the Korean Patent Application Nos. 10-2007-0038632, filed on Apr. 20, 2007, 10-2007-0038701 filed on Apr. 20, 2007 and 10-2007-0038631 filed on Apr. 20, 2007, which are hereby incorporated by reference as if fully set forth herein.

BACKGROUND OF THE INVENTION

1. Field of the Invention

The present invention relates to a mobile terminal, and more particularly, to a mobile terminal and screen displaying method thereof.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, many efforts have been made to develop and research a screen display of a mobile terminal in pursuit of a function for user's convenience and attraction.

SUMMARY OF THE INVENTION

Accordingly, the present invention is directed to a mobile terminal and screen displaying method thereof that substantially obviate one or more problems due to limitations and disadvantages of the related art.

An object of the present invention is to provide a mobile terminal and screen displaying method thereof, by which an image can be displayed on a screen using a virtual polyhedral pillar.

Another object of the present invention is to provide a mobile terminal and screen displaying method thereof, by which an image displayed on a screen can be transposed using a rotation of a virtual polyhedral pillar.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit for inputting key signals, a display for displaying a first facet of a polyhedral pillar, and a controller, if a specific key signal is inputted, the controller controlling a second facet of the polyhedral pillar to be displayed on the display by rotating the polyhedral pillar.

In another aspect of the present invention, a method of displaying a screen in a mobile terminal according to the present invention includes displaying a first facet of a polyhedral pillar and displaying a second face of the polyhedral pillar by rotating the polyhedral pillar.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 5 to 10 are diagrams for a screen displaying method of a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
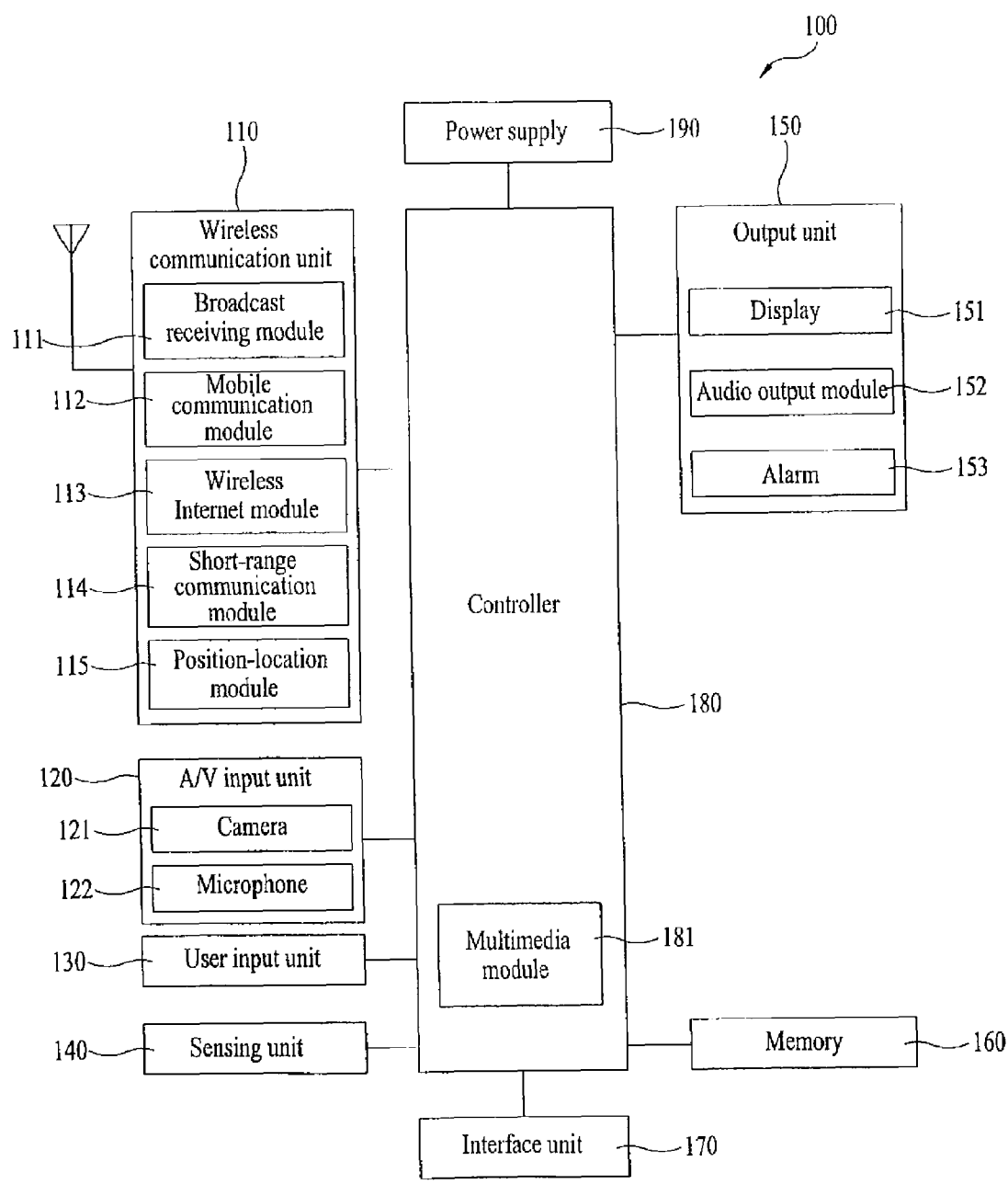
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT- LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
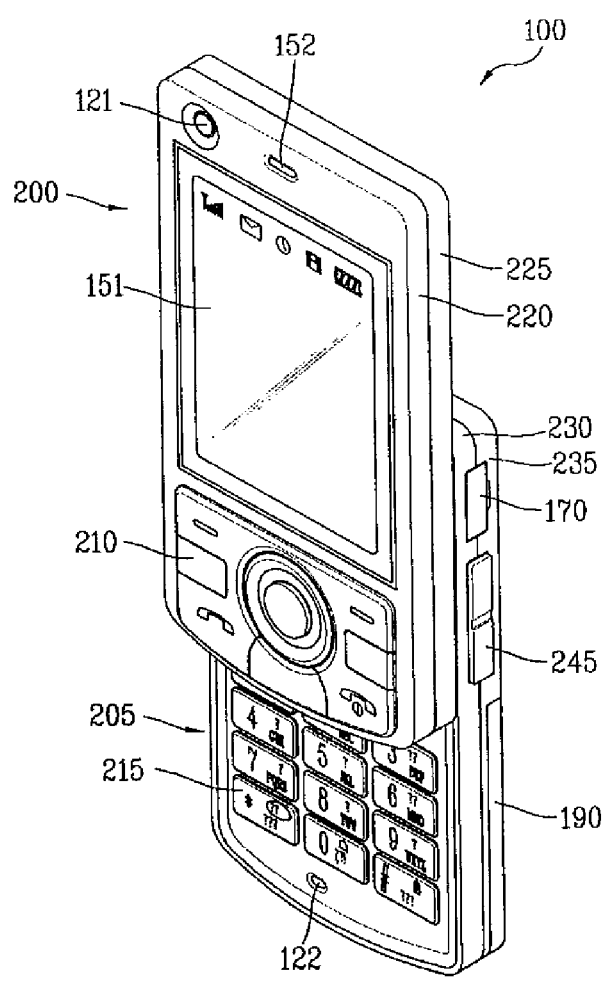
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
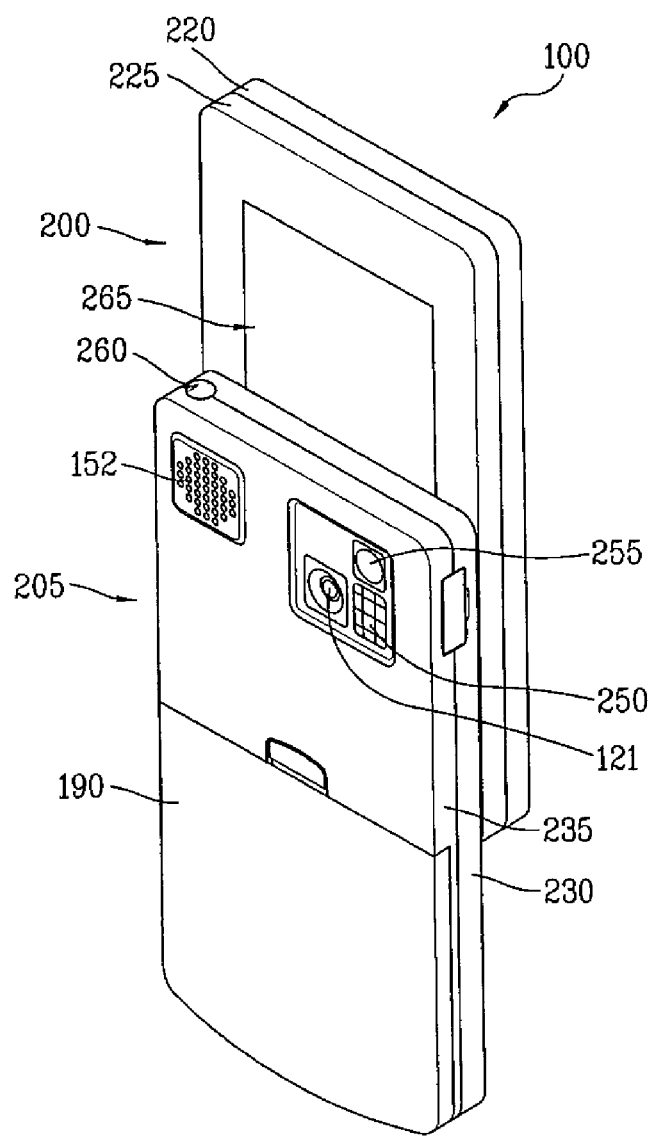
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
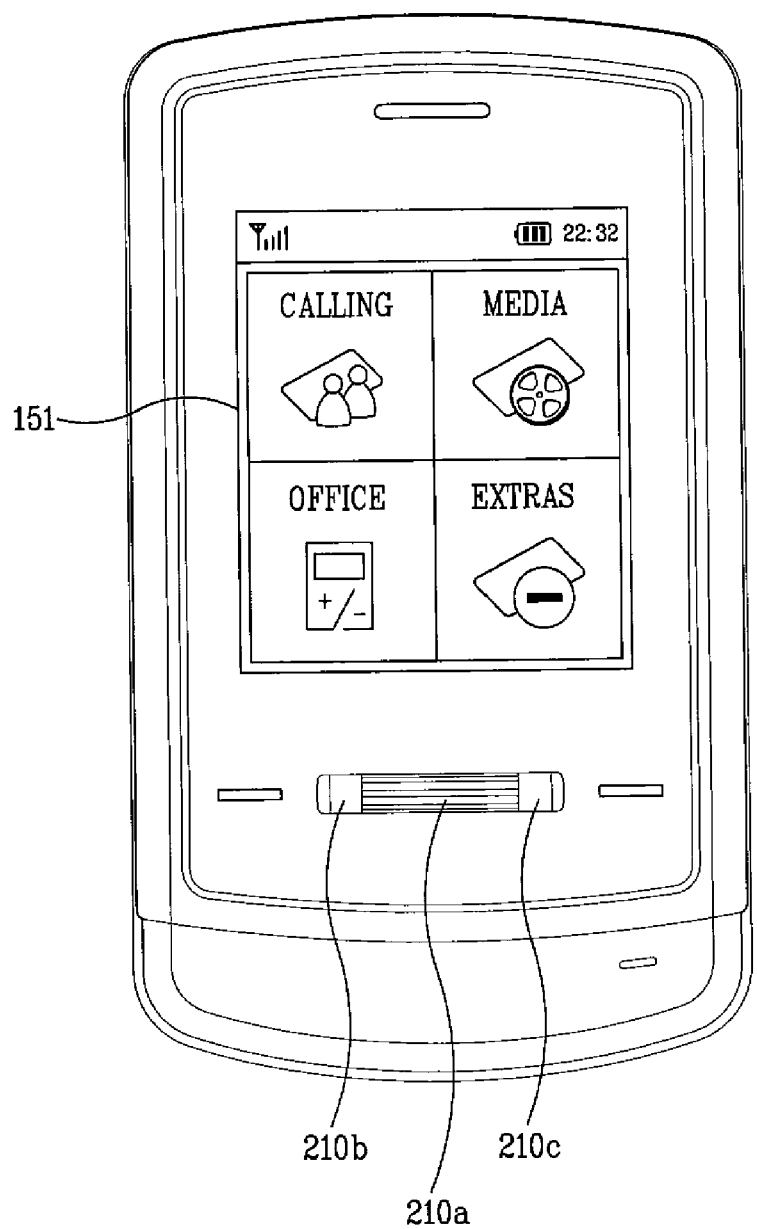
FIG. 4 is a front diagram of a mobile terminal according to another embodiment of the present invention.

FIG. 4 is a front diagram of a mobile terminal according to another embodiment of the present invention.

Referring to FIG. 4, a mobile terminal according to another embodiment of the present invention includes a first user input unit. And, the first user input unit includes a scroll key 210a, a left-directional key 201b, and a right-directional key 210c. In this case, the left-directional key 210b generates a key signal for a left-directional shift of a cursor or a highlight for item selection. And, the right-directional key 210c generates a key signal for a right-directional shift of the cursor or the highlight for item selection.

In particular, in case that a key signal is generated by pressing the scroll key 210a while a specific item is selected, a key signal relevant to an entry into the specific item can be generated.

A plurality of menu items are displayed on a display 151 shown in the drawing. So, it is able to shift the highlight for a specific menu selection from the displayed menu.

In this case, the scroll key 210a generates a key signal for a shift in upper/lower direction, the left-directional key 210b generates a key signal for a shift in a left direction, and the right-directional key 210c generates a key signal for a shift in a right direction.

Hence, a position of the highlight for the menu selection can be shifted by the above-explained key manipulations. In particular, if the scroll key 210a is pressed, the menu marked by the highlight can be entered.

FIG. 5 is a diagram for a screen displaying method of a mobile terminal according to one embodiment of the present invention, in which a process for entering a selected menu item is shown.

Referring to (a) of FIG. 5, four menu items are displayed on the display 151. The number of the displayed menu items can be variously changed.

Referring to (b) of FIG. 5, if one of the four menu items is selected, the selected menu item gets enlarged gradually.

Referring to (c) of FIG. 5, the controller 180 divides the enlarged menu item into a plurality of areas. So, a plurality of sub-menu items corresponding to the enlarged menu item can be displayed on the divided areas, respectively. In this case, the divided areas can be represented in a manner of flipping over in the course of the division. The meaning of 'flipping over' includes that the divided area is represented by 3-dimensionally turning forward or backward on a screen.

Referring to (d) of FIG. 5, the selected menu item (higher item) and sub-items for the higher item) are displayed in the divided area. In particular, the item for a phonebook (CALLING) and sub-items corresponding to the phonebook (CALLING) are displayed on the display 151.

In this case, it is able to shift apposition of a highlight through key manipulations of the mobile terminal. This example is shown in FIG. 6.

Figure 6:
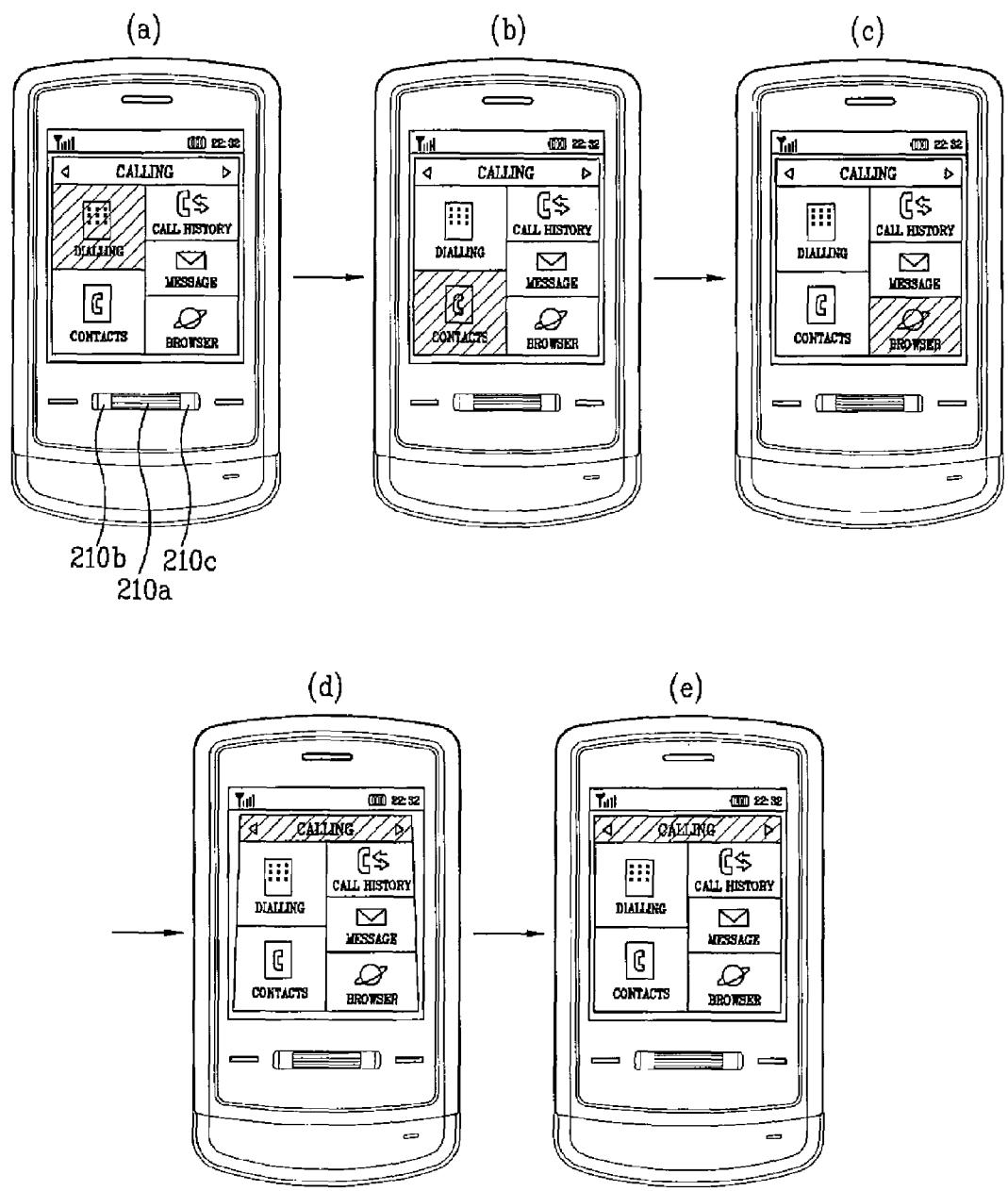

Referring to (a) to (e) of FIG. 6, it is able to shift a position of a highlight using a scroll key 210a. For instance, a position of a highlight light appearing on a sub-menu on a left upper end is shifted in a manner that the scroll key 210a is scrolled downward.

In particular, if the scroll key 210a is scrolled down when the highlight, as shown in (c) of FIG. 6, is located at a lower menu on a right lowest end, it is able to shift the highlight, as shown in (d) and (e) of FIG. 6, to the upper menu ('phonebook (CALLING)' in the drawing). In order for a user to recognize the entry to the upper menu, the image may shake as shown in (d) of FIG. 6, which shows a status that a corresponding image inclines backward at a prescribed angle.

Meanwhile, a mobile terminal according to one embodiment of the present invention is able to display a higher item and at least one lower item corresponding to the higher item on a first facet of a polyhedral pillar or spectrum.

A method of shifting an image by displaying an item on a prescribed facet of a polyhedral pillar is explained as follows.

Figure 7:
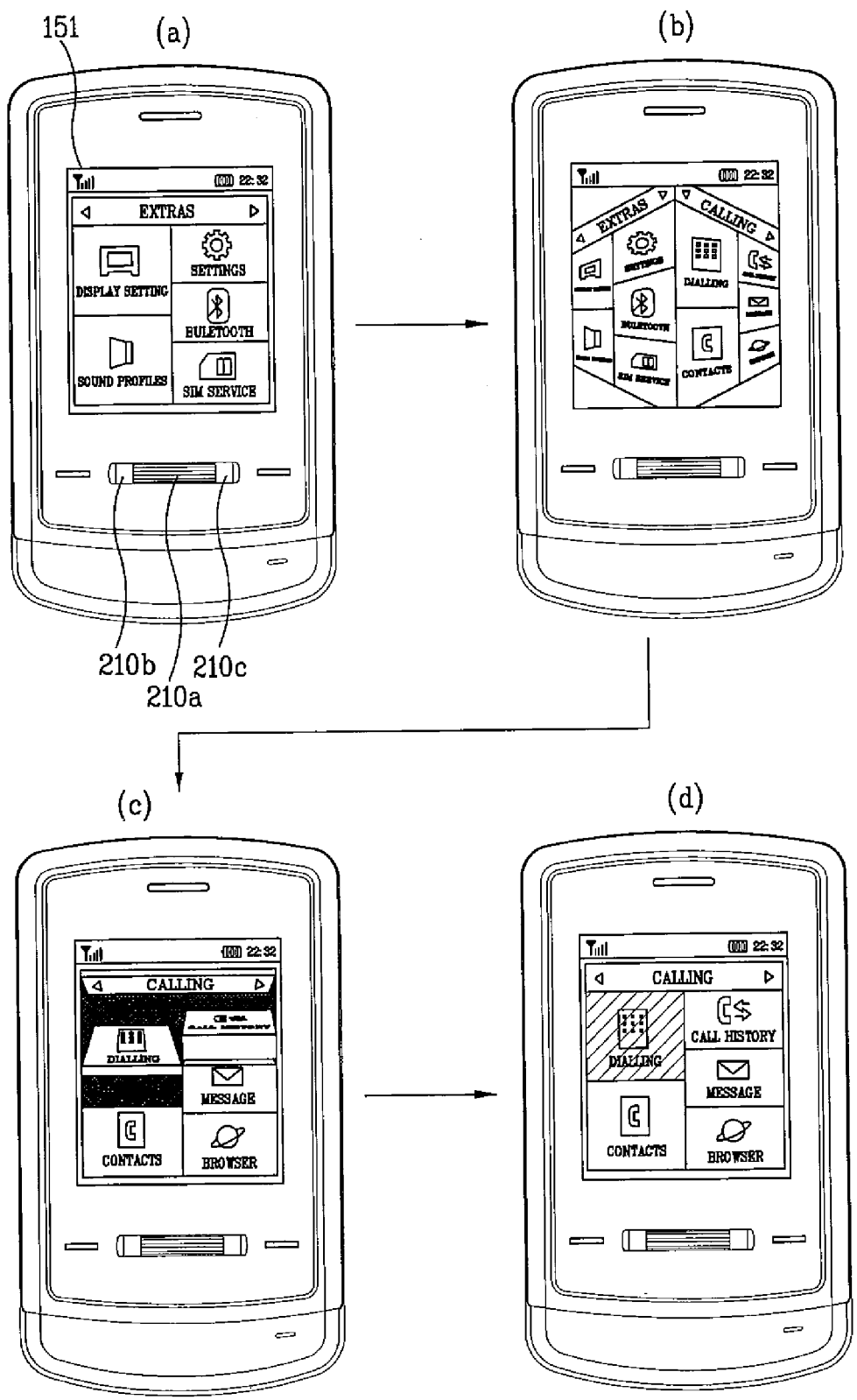

FIG. 7 is a screen displaying method in a mobile terminal according to one embodiment of the present invention.

Referring to FIG. 7, an image shown in (a) of FIG. 7 represents a first facet of a polyhedral pillar.

A first higher item is displayed on an upper end of the first facet of the polyhedral pillar. A plurality of lower items corresponding to the first higher item are displayed below the first higher item. And, a highlight is marked on the higher item located at the upper end.

Thus, while the highlight is marked at the higher item on the upper end, if a key signal for an image shift is inputted, the controller 180 turns the polyhedral pillar to display a second facet of the polyhedral pillar. In this case, a key input for an image shift can be carried out using a left-directional key 210b or a right-directional key 210c. In particular, in a case where the display 151 is configured as a touch screen, a user may apply a touch input on the touch screen instead of using the directional keys. For example, a user may apply a horizontal touch-drag to the right on the touchscreen to obtain the same effect of using the right-directional key 210c.

If the left-directional key 210b is inputted, the controller 180 controls the polyhedral pillar to be turned in a left direction. If the right-directional key 210c is inputted, the controller 180 controls the polyhedral pillar to be turned in a right direction. Alternatively, if a horizontal touch-drag to the right is input on the touch screen, the controller 180 controls the polyhedral pillar to be turned in a right direction.

If the polyhedral pillar is turned in accordance with a key signal for an image shift, a rotation of the polyhedral pillar undergoes an intermediate status as shown in (b) of FIG. 7. Thus, the polyhedral pillar is turned in a virtual 3-dimensional space.

If the rotation further proceeds, a second facet of the polyhedral turns to appear gradually. On the appearing second facet, a second higher item and at least one lower items corresponding to the second higher item are displayed.

In this case, the lower item corresponding to the higher item can be displayed by flipping over, which is shown in (c) of FIG. 7 for example. By displaying the flipping lower item corresponding to the higher item, a user is able to visually recognize the approximate number of the lower items.

Referring to (d) of FIG. 7, after completion of the rotation, the second facet of the polyhedral pillar is fully displayed. On the displayed second facet, the second higher item and the lower items corresponding to the second higher item are displayed.

meanwhile, a mobile terminal according to one embodiment of the present invention provides a method of displaying a screen using stacked polyhedral pillars. This method is applicable to a calendar representation.

Figure 8:
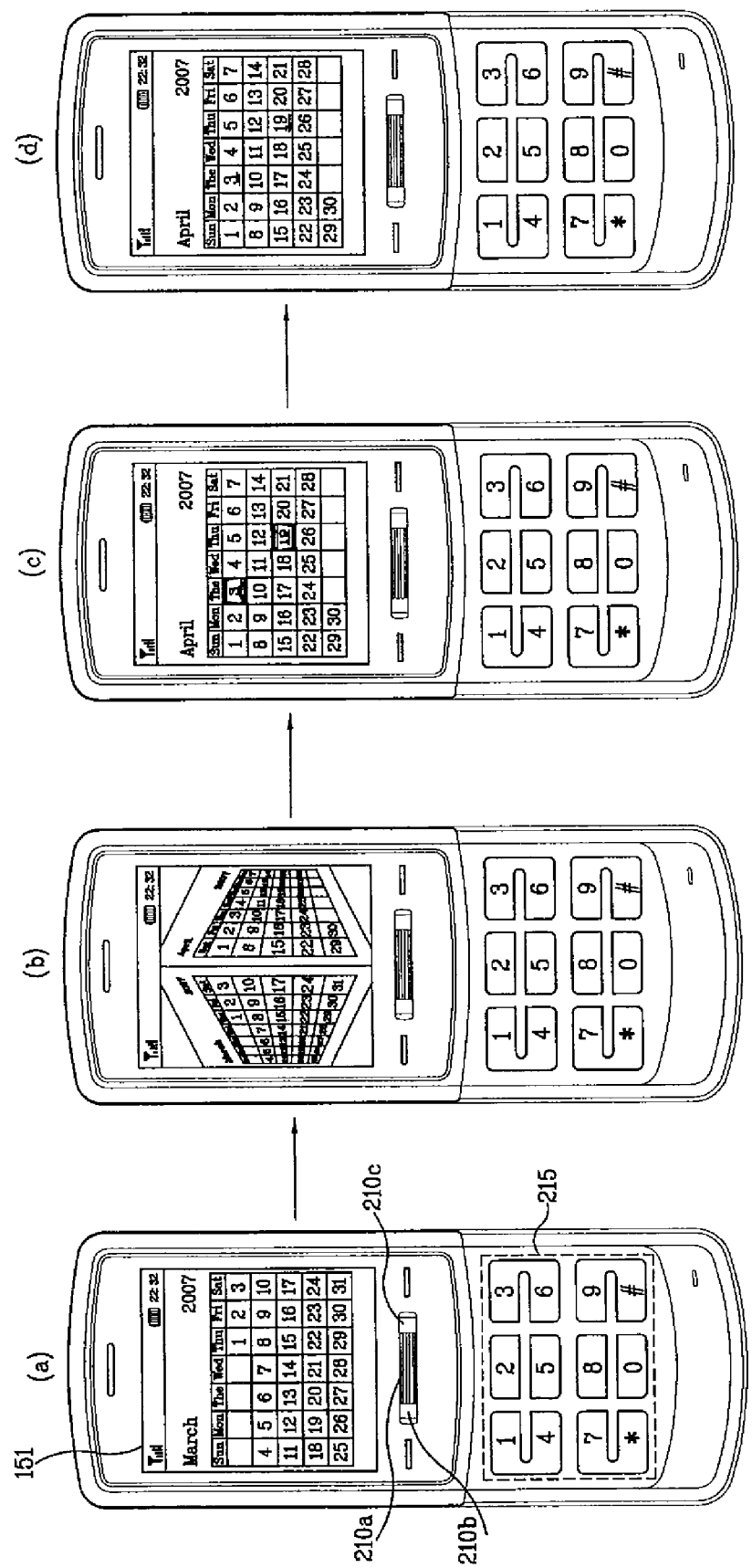

FIG. 8 is a diagram for a screen displaying method of a mobile terminal according to one embodiment of the present invention, in which a calendar representing method is shown. In this case a calendar may include a schedule-relevant calendar.

First of all, in case of receiving a key signal for a left/right-directional shift while a first facet of a first polyhedral pillar, as shown in (a) of FIG. 8, among stacked polyhedral pillars is displayed, the controller 180 is able to display a second facet of the first polyhedral pillar by rotating the polyhedral pillar. In this case, the whole months of a year can be represented on facets of the first polyhedral pillar. Hence, the first polyhedral pillar may include a 2-facet pillar.

The key signal for the left/right-directional shift can be generated using the second user input unit 215. For instance, the key signal for the left/right-directional shift can be matched to a numeral key '4/6' of the second user input unit 215. For instance, the key signal for the left-directional rotation is matched to the numeral key '4', and the key signal for the right-directional rotation is matched to the numeral key '6'.

If the key signal for the left- or right-directional shift is inputted, the controller 180 controls the first polyhedral pillar to be rotated. An intermediate status of the rotation of the first polyhedral pillar is shown in (b) of FIG. 8.

As the rotation further proceeds, the second facet of the first polyhedral pillar gradually appears. On the appearing second facet, a different month in the same year of the calendar displayed on the first facet of the first polyhedral pillar is displayed.

In this case, the controller 180 is able to display a scheduled day to be discriminated from the rest of days. For instance, the scheduled day, as shown in (c) of FIG. 8, can be displayed by flipping over. Alternatively, the scheduled day can be represented by repeating its rotational motion.

Subsequently, the rotation further proceeds and is then completed. If so, the second facet of the first polyhedral pillar is fully displayed. In this case, a scheduled day can be represented to be discriminated from the rest of days. For instance, the scheduled day is represented as colored. Alternatively, the scheduled day, a shown in (d) of FIG. 8, is represented as underlined.

By displaying the scheduled day(s) to be discriminated from others, a user is able to visually confirm how many days are scheduled.

In case of receiving a key signal for an up/down shift while a first facet of a first polyhedral pillar among stacked polyhedral pillars is displayed, a mobile terminal according to one embodiment of the present invention is able to display a first facet of a second polyhedral pillar by shifting the stacked polyhedral pillars up and down. In this case, a calendar in a year different from that of the same month displayed on the first facet of the first polyhedral pillar can be displayed on the first facet of the second polyhedral pillar. An example for shifting the above image is shown in FIG. 9.

First of all, it is able to generate the key signal for the up/down shift using the second user input unit 215. For instance, the key signal for the up/down shift can be matched to a numeral key '2/8' of the second user input unit 215. In particular, the key signal for the up shift is matched to the numeral key '2' and the key signal for the down shift can be matched to the numeral key '8'. In particular, in a case where the display 151 is configured as a touch screen, a user may apply a touch input on the touch screen instead of using the second user input unit 215. For example, a user may apply an up/down touch-drag on the touchscreen to obtain the same effect of using the second user input unit 215.

By the down shift, a year is incremented. By the up shift, a year is decremented. It is understood that the key signal for the year increment and the key signal for the year decrement can be switched to each other.

Figure 9:
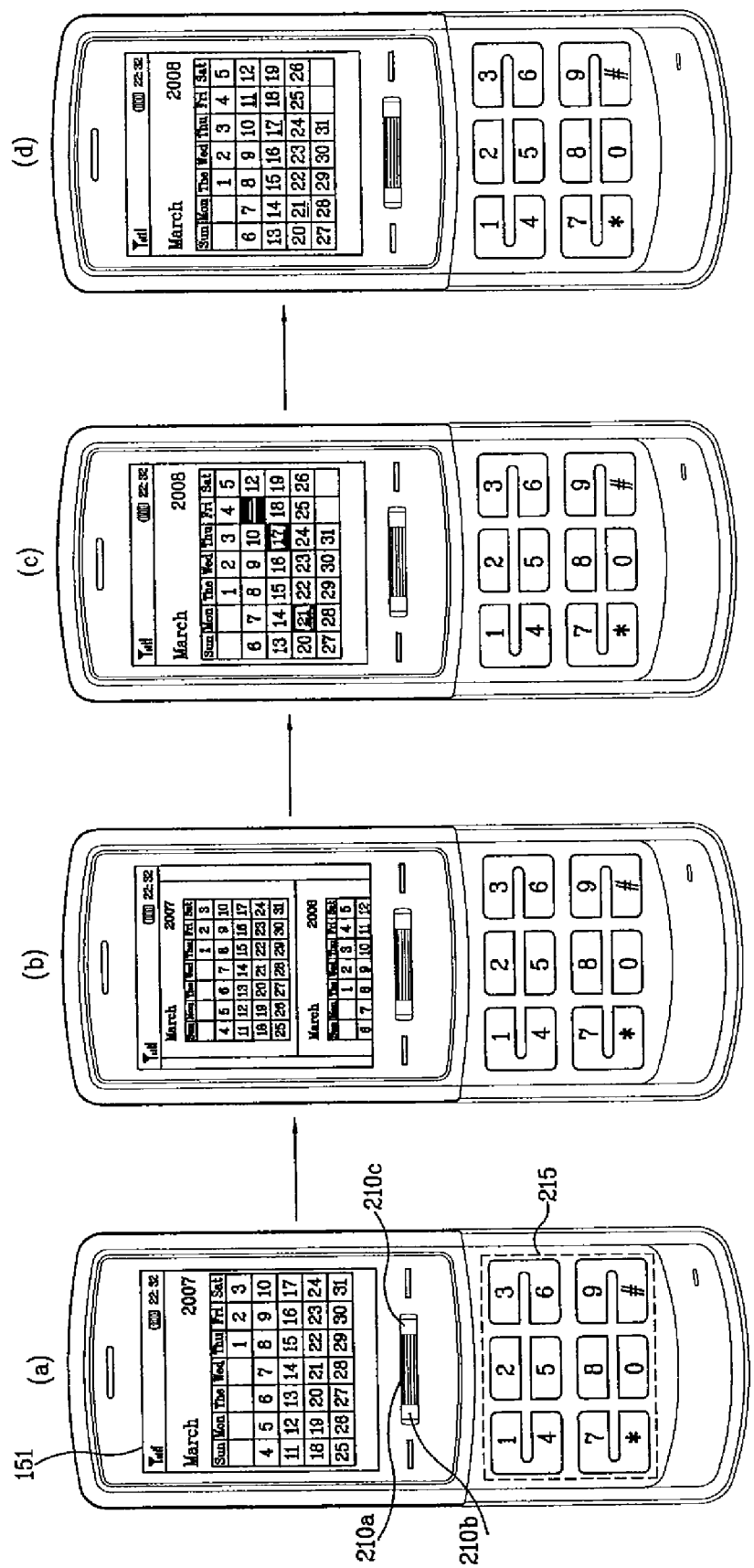

While the first facet of the first polyhedral pillar, as shown in (a) of FIG. 9, is displayed, if the key signal for the up or down shift is inputted, the controller 180 controls the stacked polyhedral pillars up and down. An intermediate status of the down shift of the first polyhedral pillar is shown in (b) of FIG. 9.

As the down shift further proceeds, the first facet of the second polyhedral pillar gradually appears. On the appearing first facet of the second polyhedral pillar, a different year of the same month of the calendar displayed on the first facet of the first polyhedral pillar is displayed. In this case, the controller 180 is able to display at least one scheduled day to be discriminated from others. For instance, a scheduled day, as shown in (c) of FIG. 9, can be displayed in a manner of flipping over. Alternatively, a scheduled day can be displayed in a manner of repeating its rotational motion.

As the down shift further proceeds, it is completed. If so, the first facet of the second polyhedral pillar is fully displayed. In this case, at least one scheduled day can be displayed to be discriminated from others. For instance, a scheduled day, as shown in (d) of FIG. 9, can be discriminated by being colored or underlined.

By displaying a scheduled day to be discriminated from others, a user is able to visually and approximately confirm how many days of a corresponding month are scheduled.

According to one embodiment of the present invention, it is able to shift an image of a calendar representing a current month via specific key signal input. In this case, the specific key signal can be matched to a numeral key '5' of the second user input unit 215.

In the mobile terminal according to one embodiment of the present invention, it is able to confirm whether a schedule is set or not in the calendar shown in FIG. 8 or FIG. 9.

Figure 10:
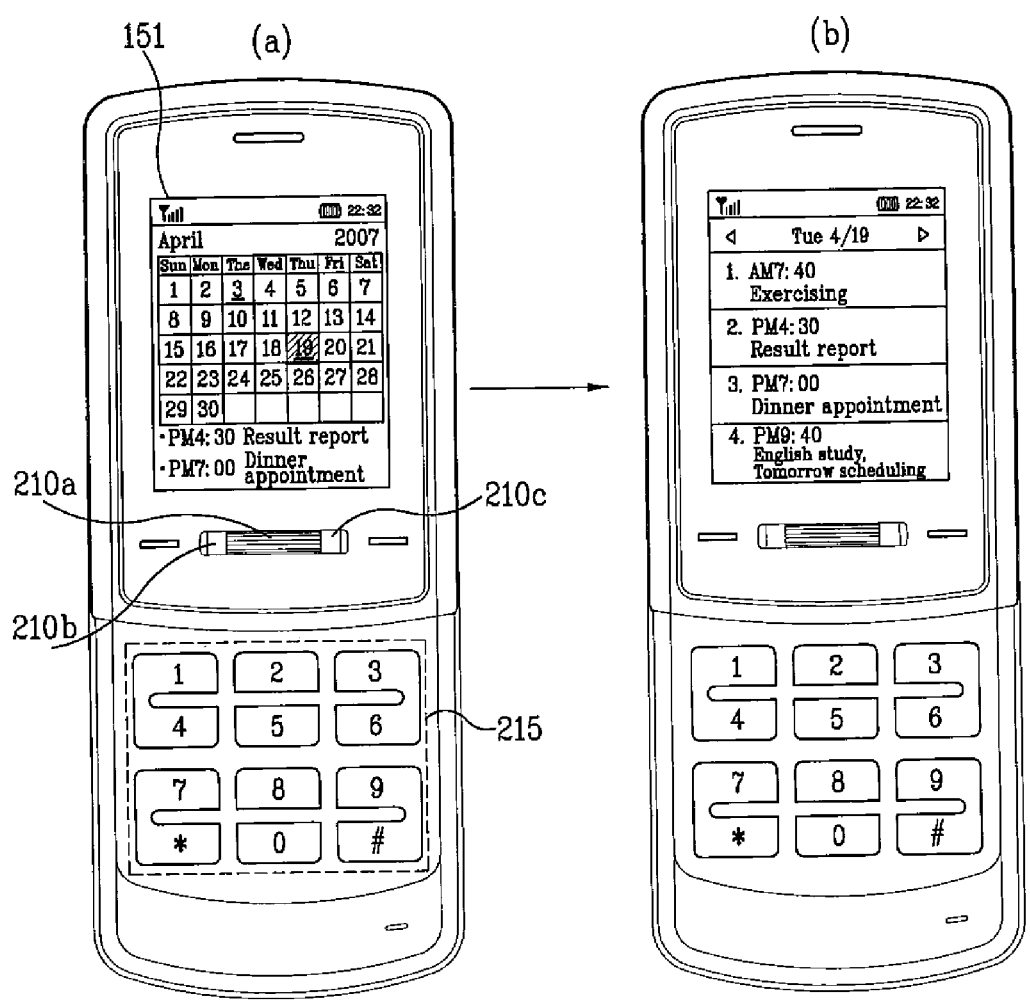

FIG. 10 shows a screen displaying method for executing a confirmation of a presence or non-presence of a schedule setup.

Referring to FIG. 10, it is able to check a presence or non-presence of a schedule on a highlighted day in a displayed calendar.

Referring to (a) of FIG. 10, if a schedule is set UP, it can be schematically displayed on a lower end of a screen.

If an 'OK' key is inputted while a scheduled day is highlighted, a schedule corresponding to the highlighted day, as shown in (b) of FIG. 10, is enlarged and displayed.

In this case, the 'OK' key input can be generated by pressing a scroll key 210*a*. Through the enlarged and displayed schedule, details of the schedule can be checked.

In the above description for one embodiment of the present invention, the method of displaying the screen using the stacked polyhedral pillars is explained. Alternatively, polyhedrons that can be stacked on each other are applicable to the present invention.

A screen displaying method of a mobile terminal according to another embodiment of the present invention is explained as follows.

A method of displaying a menu in a mobile terminal according to one embodiment of the present invention is explained with reference to FIG. 11 as follows.

Figure 11:
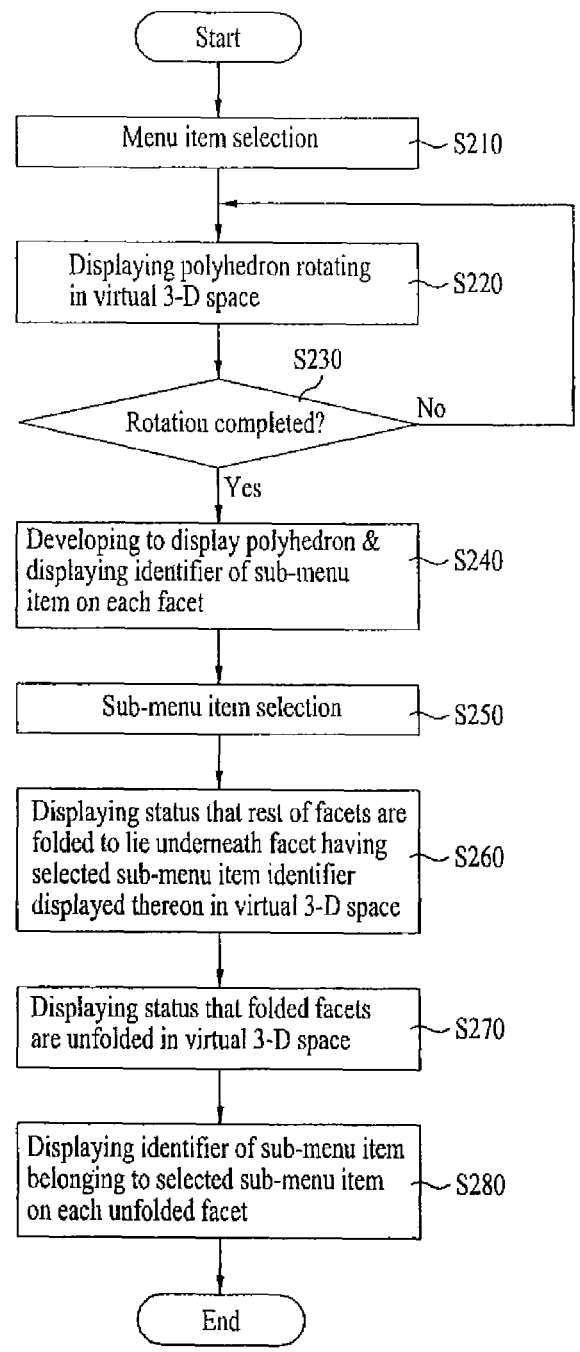
FIG. 11 is a flowchart for a method of displaying a menu in a mobile terminal according to one embodiment of the present invention.

FIG. 11 is a flowchart for a method of displaying a menu in a mobile terminal according to one embodiment of the present invention.

Referring to FIG. 11, a user selects one of at least one or more menu items in the mobile terminal [S210]. In this case, the menu item means a category for a function/operation provided by the mobile terminal. And, the menu means a list constructed with at least one or more menu items. Moreover, the menu can become a single menu item as well.

For instance, in the menu item, there is 'menu' as a highest menu item. There are 'phonebook', 'message', 'multimedia', 'screen setting', 'internet access', and the like as menu items belonging to the 'menu'. As sub-menu items belonging to the 'phonebook', there are 'phone number search', 'phone number add', 'abbreviated number setting', 'call history inquiry', etc.

The mobile terminal displays an identifier of each of the at least one or more menu items on a prescribed area of the screen. The user selects one of the displayed at least one or more identifiers to select the menu item corresponding to the selected identifier.

For instance, the mobile terminal displays each identifier of pre-designated menu items, each identifier of menu items selected by a user, or each identifier of the predetermined number of menu items in order of higher use frequency.

Each identifier of the at least one or more menu items can be displayed as a menu bar on the lower area of the screen.

In case of including a touchscreen, the mobile terminal can execute the selecting step S210 if one of the identifiers is touched by a pointer. Alternatively, if a key for selecting the menu item is inputted, the mobile terminal can execute the selection step S210

If the menu item is selected, the mobile terminal displays a polyhedron rotating in a virtual 3-dimension space [S220].

In the displaying step S220, the mobile terminal is able to display a process that the polyhedron gradually becomes complete by rotating in the virtual 3-dimensional space.

In the displaying step S220, while the polyhedron is rotating, the mobile terminal displays each identifier of a plurality of menu items including the selected menu item on a plurality of facets constructing the polyhedron, respectively or each identifier of at least one or more sub-menu items belonging to the selected menu item.

In this case, the identifier is manes for indicating a menu item and means a text or icon. And, the number of a plurality of facets constructing the polyhedron may depend on the number of a plurality of the menu items or the number of the at least one or more sub-menu items.

For instance, the mobile terminal is able to display a plurality of the facets constructing the polyhedron in a manner that each identifier of a plurality of the menu items gradually changes into each identifier of the at least one or more sub-menu items. In doing so, the mobile terminal is able to display the identifier of the selected menu item intactly on one of a plurality of the facets.

While the polyhedron is rotating, the mobile terminal is able to display each identifier of the at least one or more sub-menu items gradually on each of a plurality of the facets constructing the polyhedron. In doing so, the mobile terminal is able to display the identifier of the selected menu item on one of a plurality of the facets constructing the polyhedron.

In this case, a plurality of the menu items including the selected menu item may mean menu items at the same level of the selected menu item.

Meanwhile, in case that the selected menu item is a highest menu item, there may not exist a menu item at the same level. The menu item at the same level means menu items belonging to the same later among a plurality of menu items (or sub-menu items) belonging to one menu item.

The displaying step S220 will be explained in more detail with reference to FIG. 12 later.

The mobile terminal decides whether the rotation of the polyhedron is terminated [S230].

As a result of the decision, if it is decided that the rotation of the polyhedron is terminated, the mobile terminal develops the polyhedron to display. In this case, each identifier of the at least one or more sub-menu items belonging to the selected menu item is displayed on each of a plurality of the facets constructing the polyhedron [S240].

In the displaying step S240, the mobile terminal is able to display the identifier of the selected menu item on one of a plurality of the facets.

In the mobile terminal, one of the at least one or more sub-menu items is selected using the displayed identifier [S250].

For instance, in case that the mobile terminal includes a touchscreen, if a specific identifier is touched by a pointer, the mobile terminal is able to select a sub-menu item corresponding to the touched specific identifier.

In case that the mobile terminal includes a directional key, the mobile terminal is able to select a specific sub-menu item using the directional key. In case that numbers are assigned to the at least one or more sub-menu items, respectively, if a specific one of the numbers is selected, the mobile terminal is able to select the sub-menu item having the selected number assigned thereto.

The mobile terminal displays a status that the facets are folded to lie underneath the facet, on which the identifier of the selected sub-menu item is displayed, in a virtual 3-dimensional space [S260].

After completion of the displaying step S260, the mobile terminal displays the facet, on which the identifier of the selected sub-menu item is displayed, on the screen only.

The mobile terminal displays a status that the folded facets are unfolded in the virtual 3-dimensional space [S270].

For instance, the mobile terminal is able to display a status that the folded facets are sequentially unfolded in order of having folded a plurality of the facets or in reverse order thereof.

The mobile terminal displays each identifier of the at least one or more sub-menu items belonging to the selected sub-item menu on each of the unfolded facets [S280].

In this case, the displaying step S280 can be executed in the course of the former displaying S270 or after completion of the former displaying S270.

The mobile terminal is able to display the identifier of the selected sub-menu item on one of the unfolded facets.

The steps S250 to S280 will be explained in more detail with reference to the following drawings.

A method of displaying a menu in a terminal according to one embodiment of the present invention is explained with reference to FIG. 12 as follows.

Figure 12:
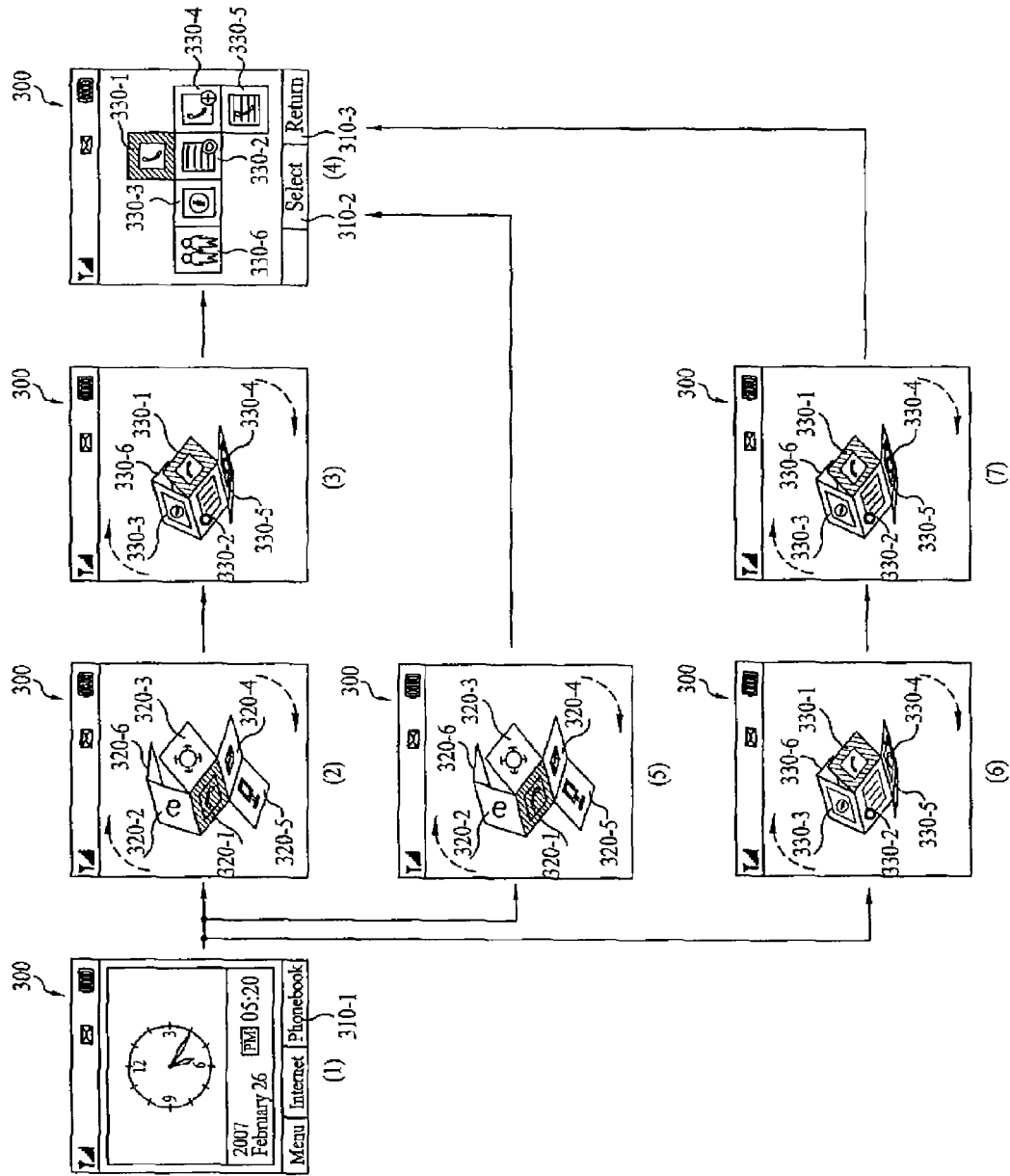
FIG. 12 and FIG. 13 are diagrams for a process for displaying a menu according to one embodiment of the present invention.

Referring to FIG. 12, first of all, the mobile terminal in a standby mode displays a plurality of menu items as a menu bar format on a lower end area of a screen 300 [1].

In the following description, when 'phonebook' 310-1 is selected from a plurality of the menu items, a process for displaying a menu for three cases is explained as follows.

First of all, in a first case, the mobile terminal displays a polyhedron that is rotating in a virtual 3-dimensional space. In particular, the mobile terminal displays an identifier 320-1 of the 'phonebook' 310-1 and identifiers of a plurality of the menu items at the same level of the 'phonebook' 310-1 on a plurality of facets constructing the polyhedron, respectively [2].

For instance, an identifier 320-1 of a 'phonebook' 310-1, an identifier 320-2 of 'internet access', and identifier 320-3 of 'schedule management', an identifier 320-4 of 'message', an identifier 320-5 of 'screen setting', and the like, as shown in the status [2], are displayed on a plurality of the facets, respectively.

The mobile terminal rotates the polyhedron to display a status that the identifiers of a plurality of the menu items gradually turn into identifiers of a plurality of sub-menu items belonging to the 'phonebook' 310-1, respectively [3]. In this case, the status [3] represents a process that the polyhedron displayed in the status [2] rotates to come into completing its shape gradually.

As soon as the rotation of the polyhedron is completed, the mobile terminal develops the polyhedron to display on the screen 300. And, the mobile terminal displays the identifiers of the sub-menu items belonging to the 'phonebook' 310-1 on a plurality of the facets constructing the developed polyhedron, respectively [4].

For instance, an identifier 330-2 of 'phone number search', an identifier 330-3 of 'abbreviated number setting', an identifier 330-4 of 'phonebook add', an identifier 330-5 of 'call history inquiry', and an identifier 360-1 of 'group call', as shown in the status [4], are displayed as the identifiers of the sub-menu items belonging to the 'phonebook' 310-1, respectively. And, the identifier 330-1 of the 'phonebook' is displayed on one of a plurality of the facets.

Secondly, in a second case, the mobile terminal displays the polyhedron rotating in a virtual 3-dimensional space in a manner of displaying the identifier 320-1 of the 'phonebook' 310-1 and identifiers of a plurality of menu items at the same level of the 'phonebook' 310-1 on a plurality of the facets constructing the polyhedron, respectively [5].

As soon as the rotation of the polyhedron is completed, the mobile terminal executes the operation of the status [4].

Thirdly, in a third case, the mobile terminal displays the polyhedron rotating in a virtual 3-dimensional space in a manner of displaying a plurality of the sub-menu items constructing the 'phonebook' 310-1 on a plurality of the facets constructing the polyhedron [6]. In this case, the identifier 330-1 of the 'phonebook' is displayed on one of a plurality of the facets.

Meanwhile, the mobile terminal displays a process that the polyhedron displayed in the status [6] rotates to gradually coming into completing its shape [7]. In doing so, each of the identifiers respectively displayed on a plurality of the facets can be displayed in a manner of getting darker gradually rather than the status [6].

As soon as the rotation of the polyhedron is completed, the mobile terminal executes the operation of the status [4].

A method of displaying a menu in a terminal according to another embodiment of the present invention is explained with reference to FIG. 13 as follows.

Figure 13:
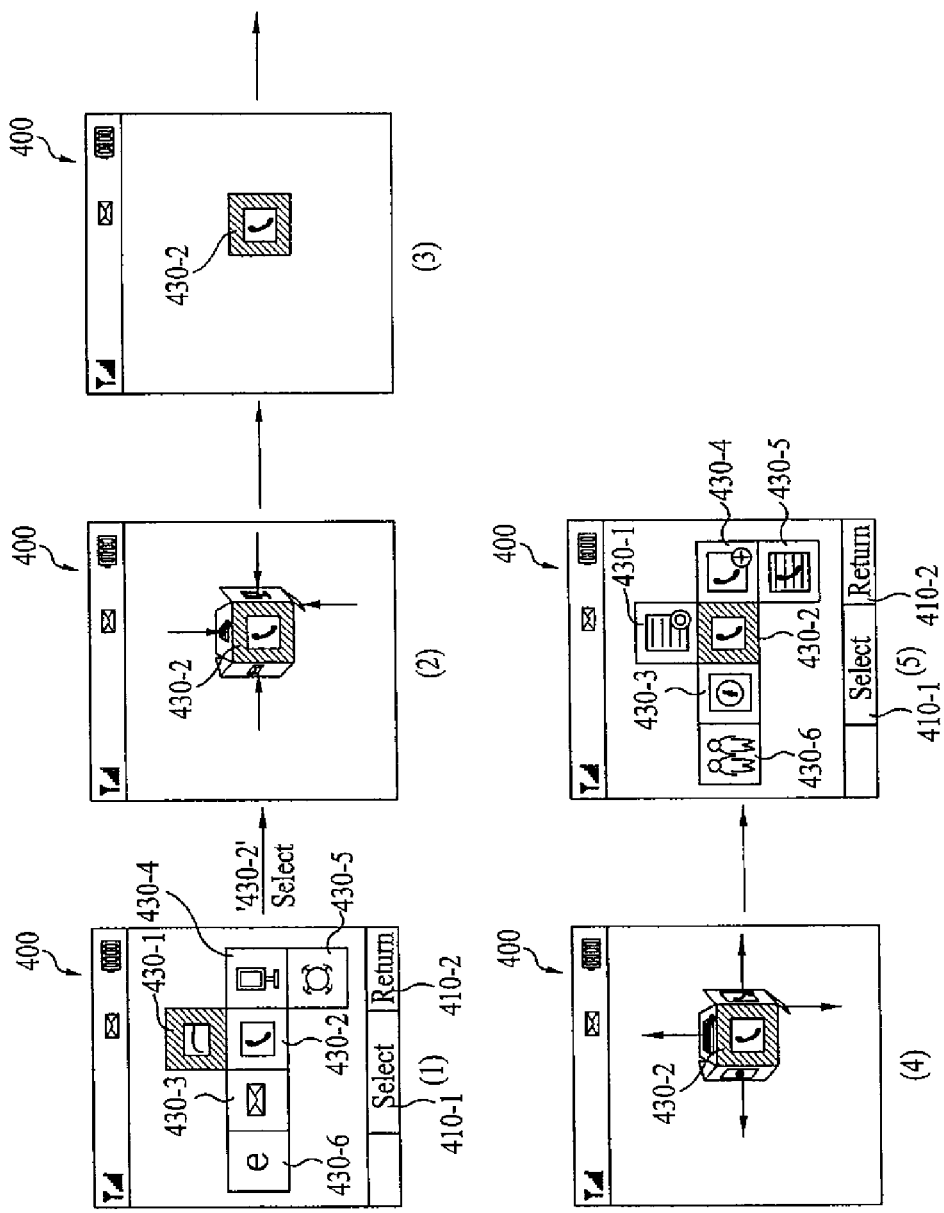

Referring to FIG. 13, first of all, the mobile terminal displays a development figure of a plurality of facets constructing a polyhedron on a screen 400 and displays identifiers of a plurality of menu items on a plurality of the facets, respectively [1].

For instance, an identifier 430-2 of 'phonebook', an identifier 430-3 of 'message', an identifier 430-4 of 'screen setting', an identifier 430-5 of 'schedule management', and identifier 430-6 of 'internet access' and the like are displayed on a plurality of the facets, respectively. And, an identifier 430-1 of 'menu', which is a higher menu item constructed with a plurality of the menu items, is displayed on one of a plurality of the facets.

In case that the identifier 430-2 of the 'phonebook' is selected from the displayed identifiers of a plurality of the menu items, the mobile terminal displays a status, which shows that the rest of the facets except the facet having the identifier 430-2 of the 'phonebook' displayed thereon are sequentially folded to lie underneath the facet having the identifier 430-2 of the 'phonebook' displayed thereon, in a virtual 3-dimensional space [2].

If the facet folded status [2] is completed, the mobile terminal displays the facet having the identifier 430-2 of the 'phonebook' displayed thereon on the screen 400 only [3].

Subsequently, the mobile terminal displays a status that the folded facets lying underneath the facet having the identifier 430-2 of the 'phonebook' displayed thereon are sequentially unfolded and also displays identifiers of a plurality of sub-menu items belonging to the 'phonebook' on the unfolded facets, respectively [4]. In this case, the mobile terminal is able to display the identifier 430-2 of the 'phonebook' intact on one of the unfolded facets.

As the facet unfolded status is completed in the status [4], the mobile terminal displays the identifiers of a plurality of the sub-menu items belonging to the 'phonebook' on the unfolded facets, respectively [5].

A method of setting a background image in a mobile terminal according to the present invention is explained with reference to FIG. 14 and FIG. 15 as follows.

Figure 14:
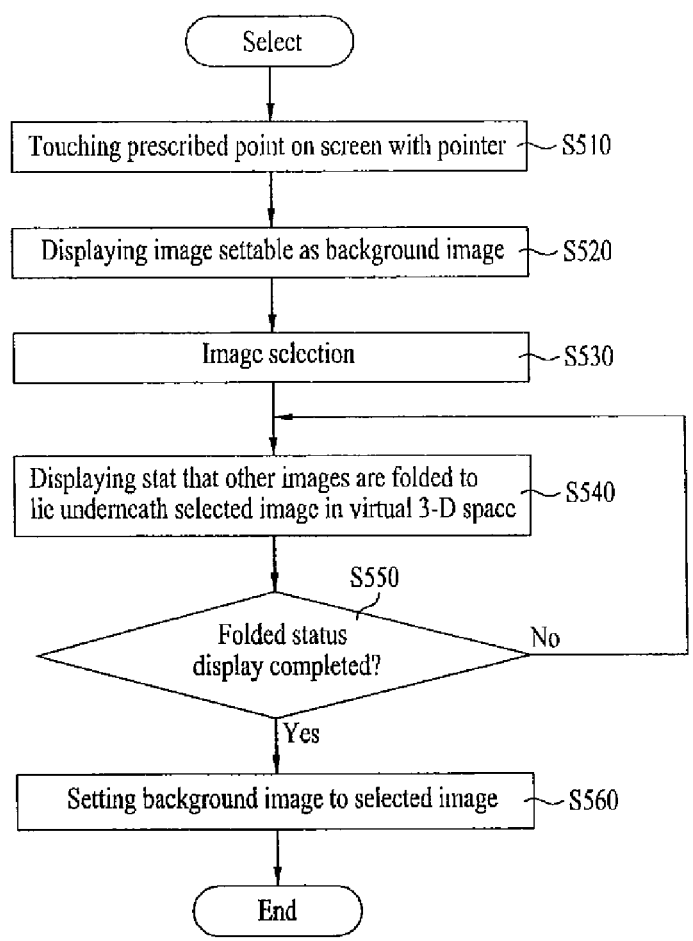
FIG. 14 is a flowchart of a process for setting a background image in a mobile terminal according to one embodiment of the present invention.
Figure 15:
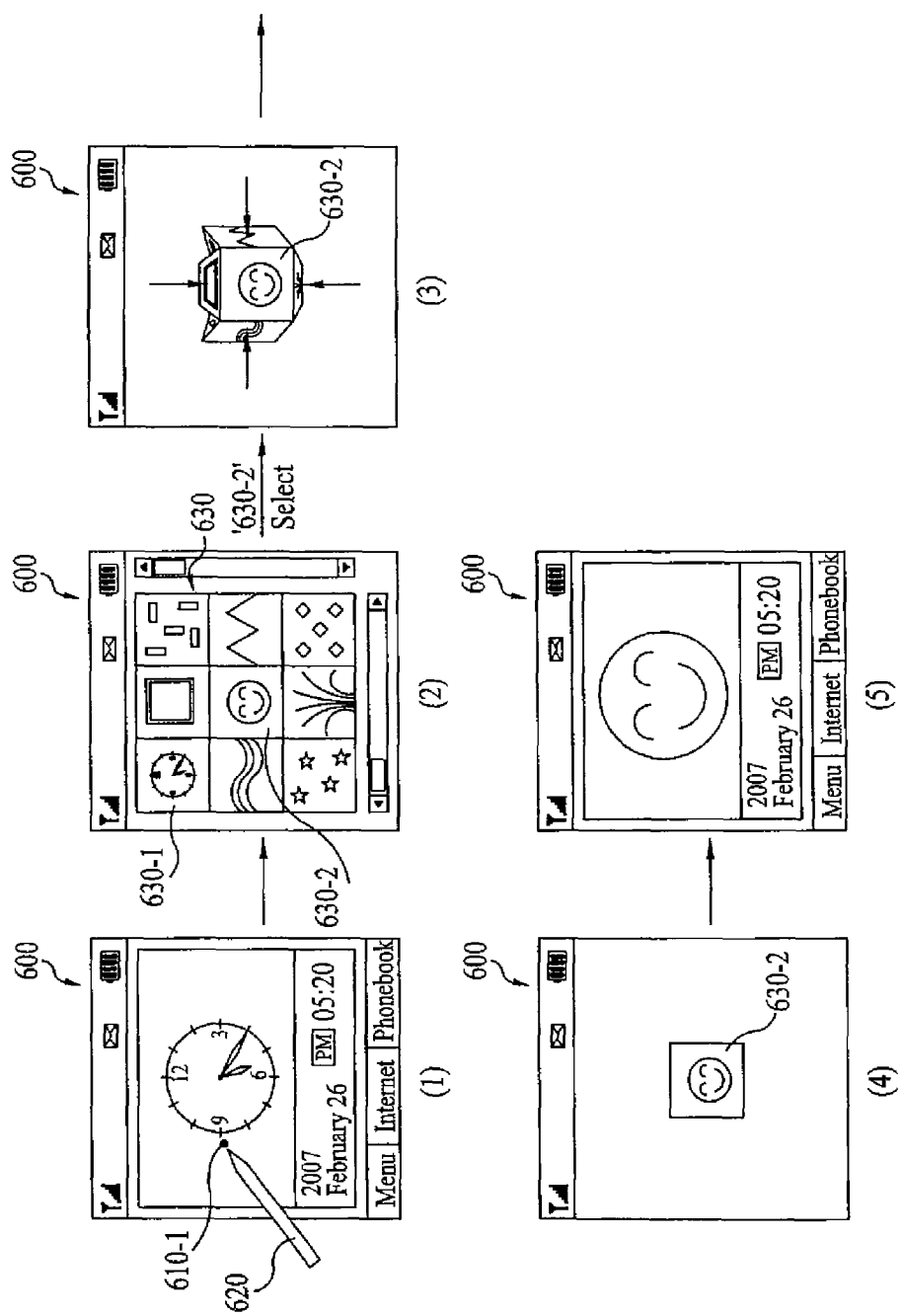
FIG. 15 is a diagram for explaining a process for setting a background image in a mobile terminal according to one embodiment of the present invention.

FIG. 14 is a flowchart of a process for setting a background image in a mobile terminal according to one embodiment of the present invention, and FIG. 15 is a diagram for explaining a process for setting a background image in a mobile terminal according to one embodiment of the present invention.

Referring to FIG. 14 and FIG. 15, a user touches a prescribed point of a screen in a standby mode using a pointer [S510].

For instance, referring to (1) of FIG. 15, the user enables a prescribed point 610-1 of a screen 600 to be touched by a pointer 620.

As the prescribed point is touched, a mobile terminal displays at least one image that can be set as a background image [S520].

In particular, the mobile terminal is able to display the at least one image as a thumbnail image. And, the image settable as the background image includes one of an image previously stored in the mobile terminal, an image captured by the mobile terminal, and an image provided by an external terminal or a server. Moreover, the image settable as the background image includes one of a still image, a moving image, an animation image, a flash image, and the like.

In this case, in case of being touched over a predetermined duration or a prescribed count by the pointer, the mobile terminal is able to execute the displaying step S520. In particular, only if there exists a touch action required for executing the displaying step S520, the mobile terminal is able to execute the displaying step S520.

Meanwhile, the mobile terminal may execute the displaying step S520 in case of receiving a key (not shown in the drawing) for a background image setup in a standby mode.

For instance, the mobile terminal display a plurality of images, each of which is settable as the background image, on the screen 600, as shown in (2) of FIG. 15. In this case, an image 630-1 corresponding to the preset background image can be displayed as highlighted at a head position in a list 630 constructed with a plurality of the images.

The mobile terminal receives a selection made by a user for at least one of the displayed images [S530].

For instance, in case that the mobile terminal includes a touchscreen, the mobile terminal is able to select the image touched by the pointer from the displayed at least one or more images. And, the mobile terminal is able to select one of the images using a directional key provided to the mobile terminal.

For instance, the user is able to select an image to set as a background image, as shown in (2) of FIG. 15, in a manner of selecting a specific image 630-2 from a plurality of the displayed images.

Subsequently, the mobile terminal displays a status that the rest of the images are folded to lie underneath the selected image in a virtual 3-dimensional space [S540].

For instance, the rest of the images are sequentially folded to lie underneath in prescribed order.

For instance, referring to (3) of FIG. 15, the mobile terminal displays a status that the rest of the images are sequentially folded to lie underneath the selected specific image 630-2 in the virtual 3-dimensional space.

Subsequently, the mobile terminal decides whether the display operation of the image-folded status is completed [S550].

As a result of the decision, if deciding that the display operations is completed, the mobile terminal sets the background image to the selected image [S560].

For instance, referring to (4) of FIG. 15, in case that the image-folded status is completed, the mobile terminal displays the selected image 630-2 on the screen 600 only. Subsequently, referring to (5) of FIG. 15, the mobile terminal enlarges the selected image 630-2 into a background image size and then sets the background image to the enlarged image.

Accordingly, the present invention provides the following effects or advantages.

First of all, the present invention displays a screen using a polyhedral pillar.

Secondly, the present invention rotates a polyhedral pillar in a virtual 3-dimensional space to display various facets of the polyhedral pillar.

Thirdly, the present invention effectively displays a menu using an image in a virtual 3-dimensional space.

Fourthly, the present invention visually provides a user with an image shifting process from a higher menu item to a lower menu item.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A method for controlling a mobile terminal, the method comprising:

displaying, via a display of the mobile terminal, a first polyhedron having a plurality of menu items on respective facets of the first polyhedron;

applying a visual effect on a specific one of the plurality of menu items so that the specific menu item is discriminated from the rest of the plurality of menu items, the specific menu item having a specific attribute set by a user;

displaying, via the display of the mobile terminal, a first development figure having the plurality of menu items on respective facets of the first development figure, by developing the first polyhedron;

receiving, via an input unit of the mobile terminal, a first input for selecting a menu item among the plurality of menu items;

visually folding the first development figure into a second polyhedron having a three-dimensional appearance; and developing the second polyhedron into a second development figure having a two-dimensional appearance, wherein each of at least one sub-menu item of the selected menu item, and the selected menu item are simultaneously displayed on respective facets of the second development figure.

2. The method of claim 1, wherein the step of folding the first development figure comprises displaying a process that the second polyhedron gradually becomes complete from the first development figure.

3. The method of claim 1, further comprising:
receiving a second input indicating a selection of a sub-menu item among the plurality of sub-menu items of the second development figure; and
displaying only a facet corresponds to the selected sub-menu item.

4. The method of claim 1, wherein the step of folding the first development figure comprises folding the first development figure so only the facet corresponding to the selected menu item is displayed.

5. The method of claim 1, wherein each of the plurality of menu items and each sub-menu item is represented as a text or an icon.

6. The method of claim 1, wherein each of the plurality of menu items comprises a category for a function or operation provided by the mobile terminal.

7. The method of claim 1, wherein a number of the facets of the second polyhedron is dependent on a number of the plurality of menu items or a number of the sub-menu items.

8. A mobile terminal, comprising:
a user input unit configured to input signals;
a display; and
a controller configured to:
cause the display to display a first polyhedron having a plurality of menu items on respective facets of the first polyhedron;
cause the display to apply a visual effect on a specific one of the plurality of menu items so that the specific menu item is discriminated from the rest of the plurality of menu items, the specific menu item having a specific attribute set by a user;
cause the display to display a first development figure having the plurality of menu items on respective facets of the first development figure;
receive a first input indicating a selection of a menu item among the displayed plurality of menu items via the user input unit;
cause the display to display a process that the first development figure is visually folded into a second polyhedron having a three-dimensional appearance; and
develop the second polyhedron into a second development figure having a two-dimensional appearance,
wherein each of at least one sub-menu item of the selected menu item and the selected menu item are simultaneously displayed on respective facets of the second development figure.

9. The mobile terminal of claim 8, wherein the controller is further configured to cause the display to fold the first development figure by displaying a process that the second polyhedron gradually becomes complete from the first development figure.

10. The mobile terminal of claim 8, wherein the controller is further configured to:
receive a second input indicating a selection of a sub-menu item among the plurality of sub-menu item of the second development figure via the user input unit; and
cause the display to display only a facet corresponds to the selected sub-menu item.

11. The mobile terminal of claim 10, wherein the controller is further configured to cause the display to display only the facet corresponds to the selected menu item by folding the first development figure.

12. The mobile terminal of claim 8, wherein each of the plurality of menu items and each sub-menu item is represented as a text or an icon.

13. The mobile terminal of claim 8, wherein each of the plurality of menu items comprises a category for a function or operation provided by the mobile terminal.

14. The mobile terminal of claim 8, wherein a number of the plurality of facets of the second polyhedron is dependent on a number of the plurality of menu items or a number of the plurality of sub-menu items.

15. The mobile terminal of claim 8, wherein the display comprises a touch screen.

* * * * *